Dec. 22, 1959      F. V. ATKESON      2,917,871
APPARATUS FOR TREATING GLASS
Filed Sept. 23, 1955      8 Sheets-Sheet 1

INVENTOR.
FLORIAN V. ATKESON
Oscar L. Spencer
ATTORNEY

Dec. 22, 1959  F. V. ATKESON  2,917,871
APPARATUS FOR TREATING GLASS
Filed Sept. 23, 1955  8 Sheets-Sheet 3

INVENTOR.
FLORIAN V. ATKESON
BY
Oscar H. Spencer
ATTORNEY

Dec. 22, 1959   F. V. ATKESON   2,917,871
APPARATUS FOR TREATING GLASS
Filed Sept. 23, 1955   8 Sheets-Sheet 5

INVENTOR.
FLORIAN V. ATKESON
BY
Oscar L. Spencer
ATTORNEY

Dec. 22, 1959  F. V. ATKESON  2,917,871
APPARATUS FOR TREATING GLASS
Filed Sept. 23, 1955  8 Sheets-Sheet 6

INVENTOR.
FLORIAN V. ATKESON
BY
Oscar H. Spencer
ATTORNEY

Dec. 22, 1959     F. V. ATKESON     2,917,871
APPARATUS FOR TREATING GLASS

Filed Sept. 23, 1955     8 Sheets-Sheet 8

INVENTOR.
FLORIAN V. ATKESON
BY
ATTORNEY

United States Patent Office 2,917,871
Patented Dec. 22, 1959

2,917,871

APPARATUS FOR TREATING GLASS

Florian V. Atkeson, Springdale, Pa., assignor to Pittsburgh Plate Glass Company, a corporation of Pennsylvania Application September 23, 1955, Serial No. 536,080

6 Claims. (Cl. 49—45)

This application relates to apparatus for treating glass. Specifically, this invention relates to improvements in apparatus for treating glass wherein the glass has to be heated to substantially its softening temperature as a preliminary step in the glass treatment, such as in the tempering of glass or in the application of metal oxide surface coatings by spraying the heated glass surface with a dispersion containing a salt of the metal required to form the oxide.

The results obtained working with glass are dependent upon the temperature to which the glass is heated prior to its further treatments. Before the present invention, glass was heated in furnaces having insulation walls and roofs of refractory materials characterized by high thermal capacity and high porosity. A large portion of the heat required for treating the glass was wasted by egress of heated air and ingress of cold air through the refractory walls and roofs. Because of such losses, the building containing the furnaces became extremely hot and operators had to work under very uncomfortable conditions. Furthermore, the temperature of the glass during the heating process was very difficult to control in such furnaces, also known as lehrs.

In the past, the amount of heat supplied to the glass before additional treatment was subjected to the whim of the operator. Cycles of arbitrary temperatures and duration were applied to glass sheets, depending upon their thickness and chemical composition. There was no objective criterion established for modifying these arbitrary cycles in response to different prior thermal conditions in the lehr and the environment surrounding the lehr, only the subjective reasoning of the operator. Accordingly, the output of the apparatus varied considerably because of the inherent non-uniform manner of heating different sheets for identical operations.

The present invention provides apparatus insuring greater uniformity in its manufactured product by providing in glass treatment apparatus a furnace having improved temperature control means and a thermoresponsive device that "reads" the temperature of the glass and causes the subsequent glass treatment to begin at the optimum instant for efficient operation, when the glass temperature reaches its desired level. The present invention also relates to an apparatus comprising novel insulating means including spaced sheets of material having low heat capacity or specific heat (less than .3 calorie/gram/° C.), low emissivity (not over 85%, preferably under 10%), and a high reflectivity (at least 60%, preferably over 90%) at the temperatures to which the individual sheets are subjected during use. This makes the environment surrounding the heating section of the apparatus more endurable by its operators, and also provides for more efficient use of the energy utilized to raise the glass temperature to prepare it for subsequent operations.

A typical embodiment of the present apparatus comprises a rail for conveying thereon cars of a novel construction upon which glass sheets are carried in a vertical position. This rail passes through a glass treating section provided with a vertically movable, enclosed furnace adapted to be lowered for heating the glass and raised for subsequent treatments, and a horizontally displaceable treating means flanking said vertically displaceable furnace when the furnace is in its lower position, and replacing the position of the furnace when the latter is raised. The furnace comprises the novel insulation means for the walls and roof of the furnace described above. Hopper doors are included with the furnace to form the floor thereof.

When the temperature of the glass sheet being heated within the furnace reaches the desired temperature, the thermo-responsive device which "reads" the temperature of the glass sheet actuates means to raise the furnace and open the hopper doors, thus exposing the heated glass to the additional treating means. Also, in response to actuating by the thermoresponsive device, the latter means is displaced into a closed position relatively close to the opposite surfaces of the vertically supported glass sheet for treatment subsequent to heating.

The additional treating means may comprise a pair of opposing nozzled tempering means to quench the heated glass with air and cause the glass to become tempered. Alternatively, the additional treating means may include one or more spray guns for applying a transparent or opaque film of desirable electro-conductive or optical properties onto the heated base.

By providing a movable furnace and other treating means, the glass may be held in a stationary position during its entire treatment. Only two to three seconds are consumed in removing the furnace and exposing the glass to the additional treating means compared to the seven to nine seconds required by previous apparatus for the removal of the glass from a heating furnace to the subsequent treating apparatus. Since the glass sheets have less time to cool between their heat treatment and the subsequent step, they can be heated to a maximum temperature of 20 to 30° F. less than that required for prior apparatus. In the temperature range of 1150 to 1230° F., a typical range encountered in such operations depending upon the composition of glass treated, a decrease of 20° F. in glass temperature raises the viscosity threefold. Therefore, even a small decrease in the maximum temperature required for glass heating reduces heat warpage of the glass substantially. In addition, the depth of penetration of glass supporting means into the heat softened glass is substantially less using the present apparatus than prior art structures, primarily because of the lessened maximum temperature requirements for glass using the present invention.

The glass is held stationary for the entire operation including the heating and subsequent treatments, rather than moving the glass as in prior apparatus. Motion of the hot glass causes warpage and surface marring. These deficiencies are avoided in the present apparatus. The combination of holding the glass stationary and decreasing the time interval between its heating and its subsequent treatment facilitates the maintenance of uniform temperature over the entire glass surface, a critical factor in obtaining optimum results in the various operations envisioned.

The present apparatus utilizes a heating section or furnace that is sealed permanently at its top, sides and ends. Previous furnaces require a top slit opening along which an overhead rail conveyor for the glass carriage moves. Also, doors at the front and the rear of earlier apparatus provide openings for the entry and exit of the glass carriers. The top slit opening and the front and rear doors of the prior furnace upset the thermal equilibrium within the heating chamber by introducing cold air through one door to replace the hot air exhausted through the top slit opening and the other door. The only opening in the present device is the hopper opening at the bottom of the heating section. Since this opening is located on the bottom, and hot air tends to rise, there is less tendency for the heated air within the heating section to escape. Therefore, the present construction inhibits the introduction of cold air which imparts an adverse effect on the heating pattern within the furnace.

In the present apparatus, the tracks for the conveyor, on which the cars move while carrying the glass sheets for heat and subsequent treatment, are below and spaced considerably from the hot portion of the heating section. The tracks in prior art apparatus are above the furnaces and exposed to the heat which escapes through the top slit, thus causing warpage and handling troubles. With prior art apparatus, special lubricants are needed to withstand such high temperatures, rolling gear requires more critical alignments for such conditions, and cars are more likely to stick on the conveyor tracks due to heat warpage. If stainless steel is used for the overhead tracks, heat warpage does not occur, but its high coefficient of expansion causes rolling gear to stick on the overhead tracks. Placing the tracks on the bottom avoids the difficulties of the prior art apparatus enumerated above.

Accordingly, the objects of my invention are to provide improved apparatus for treating glass in accordance with the principles enunciated hereinabove.

My invention will be understood more clearly upon studying a description of a typical embodiment, which follows. It is understood that this description is for purposes of illustration rather than limitation. The latter purpose is served by the claims recited at the end of this application.

In the drawings forming part of the present disclosure,

*Conveyor and treating station*

Figure 1:
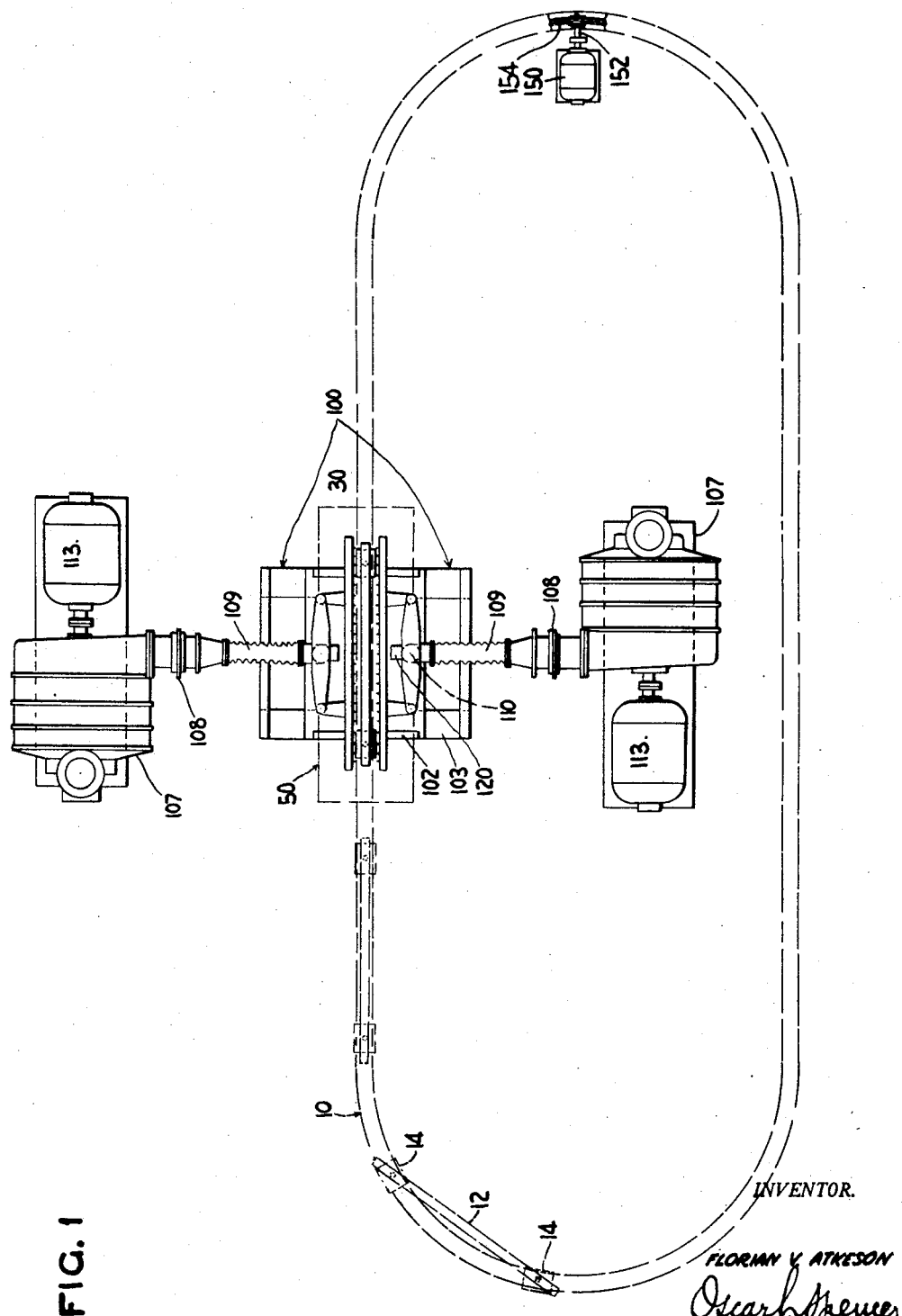
Figure 1 is a plan view of the entire assembly including a particular embodiment of tempering apparatus according to the present invention shown in its tempering position, with certain parts of the assembly shown in phantom for the sake of clarity.
Figure 3:
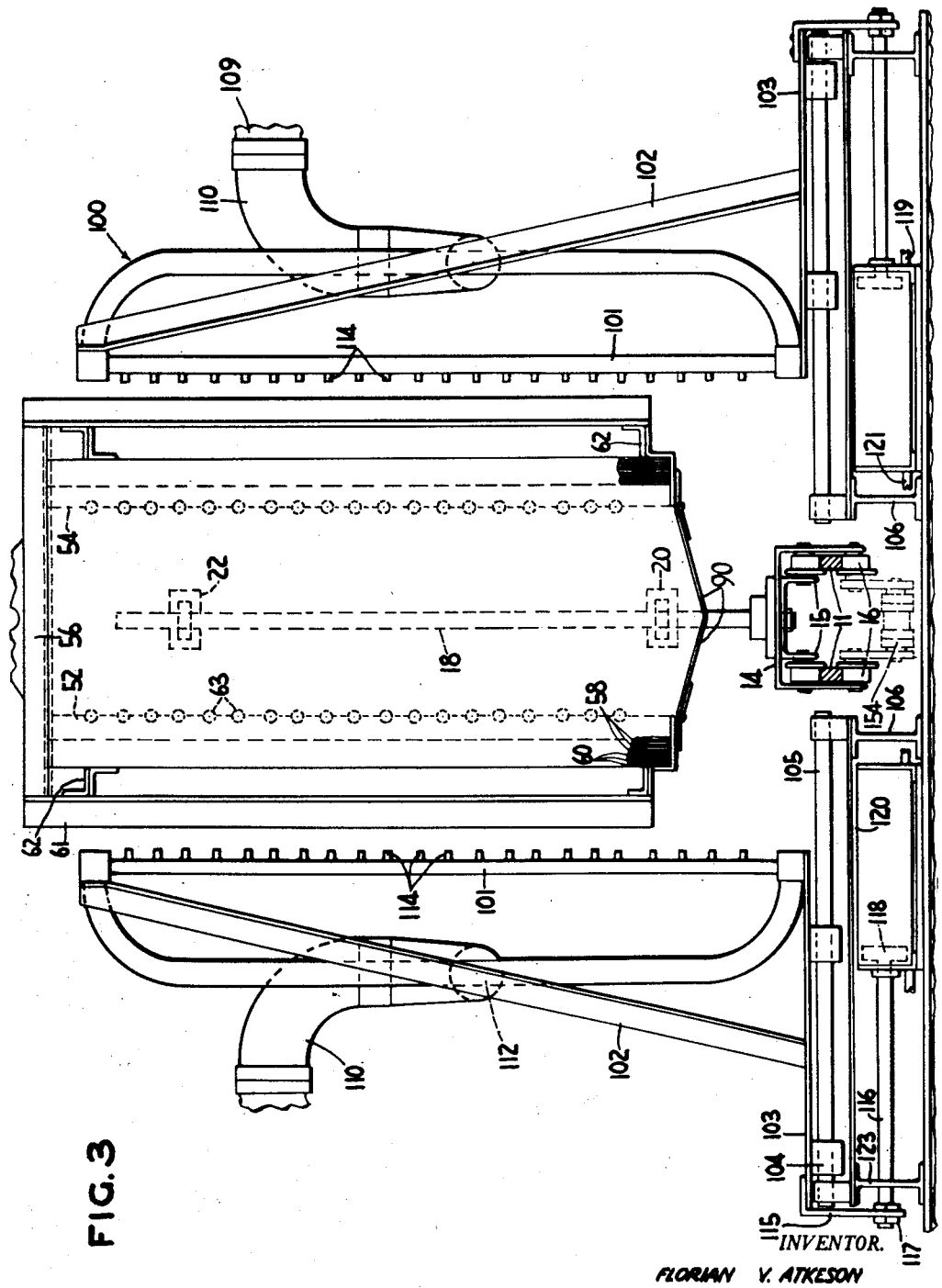
Figure 3 is a view of the apparatus similar to Figure 2, but showing the furnace in its lower position for heating the glass sheet prior to tempering.
Figure 4:
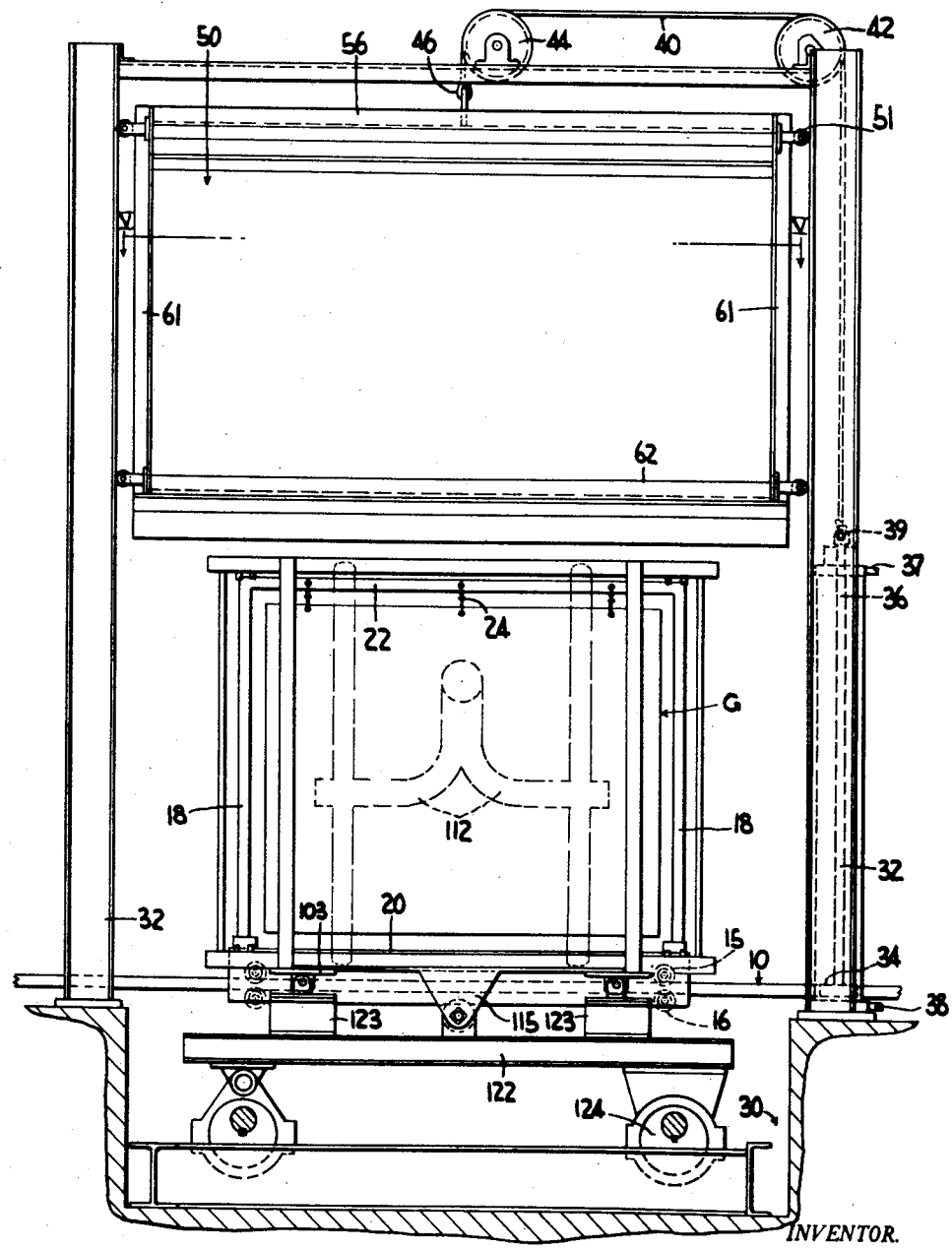
Figure 4 is an eievational section taken along the lines IV—IV of Figure 2 with certain structure omitted for clarity.

Referring to the drawings, particularly Figures 1, 3 and 4, a track 10 comprising rails 11 provides a closed circuit of elliptical configuration for movement of cars 12 thereon. Each car 12 includes rolling gear comprising a pair of pivotable trucks 14 carrying upper wheels 15 and lower wheels 16 and a frame comprising front and rear vertical posts 18 interconnected by vertically adjustable bottom beams 20 and upper beams 22. Upper beams 22 carry tongs 24 which support one or more sheets of glass G vertically. The path taken by the enclosed elliptical track passes through a treating station 30. Recessed within the floor of the building carrying the glass treating apparatus at the treating station is an oscillator pit for a tempering apparatus.

The treating station, shown in detail in Figure 4, comprises a plurality of support pillars 32 mounted on the floor of the building. One of the pillars 32 is hollow to provide a cylindrical aperture for receiving a pneumatic cylinder. A piston 34 at the bottom end of a piston rod 36 is vertically adjustable within the pneumatic cylinder. The cylinder contains an upper aperture 37 and a lower aperture 38 for the selective introduction or withdrawal of fluid on opposite sides of the piston 34 to control its location within the cylinder. The upper end of the piston rod 36 is attached by means of a hook 39 to a pulley 40 entrained over pulley wheels 42 and 44 and attached by means of hook 46 to a furnace 50.

*Furnace construction*

Figure 5:
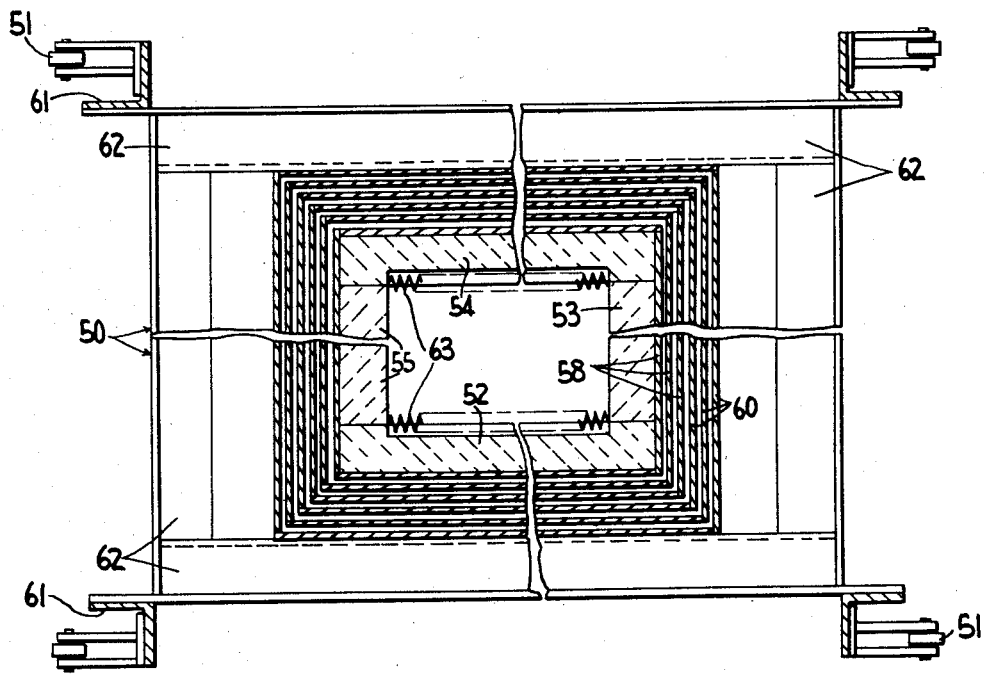
Figure 5 is an enlarged cross-sectional view of a furnace taken along the lines V—V of Figure 4.

The furnace comprises a pair of spaced vertical wall sections 52, 54 and a roof section 56 shown in section in Figure 5. Wall sections 52 and 54 are interconnected by connecting end wall sections 53 and 55. Within each wall and roof section are located a plurality of spaced interior sheets 58, of a metal having low heat capacity and emissivity and high reflectivity in the region between about 500° F. and glass softening temperatures. Additional spaced exterior sheets 60 of a metal having a low heat capacity and emissivity and high reflectivity at temperatures up to 500° F. are spaced outwardly from the interior spaced sheets and within the wall or roof sections. The interior sheets 58 are preferably composed of stainless steel, since they are normally subjected to temperatures in excess of 500° F. The exterior spaced sheets 60 are preferably of aluminum, a material that has exceptionally low emissivity at temperatures up to 500° F. For example, the emissivity of aluminum is only 3% in the temperature range between 200° F. and 300° F.

Sheets 58 and 60 (Figure 5) are preferably joined to form a series of nested boxes each having a roof and four walls. Supports 61 and 62 brace the outermost box. The boxes are spaced sufficiently to insure their separation, but not so far to allow convection currents, preferably on the order of ¼ to ½ inch. Vertical supports 61 carry rollers 51 which roll along pillars 32.

Figure 2:
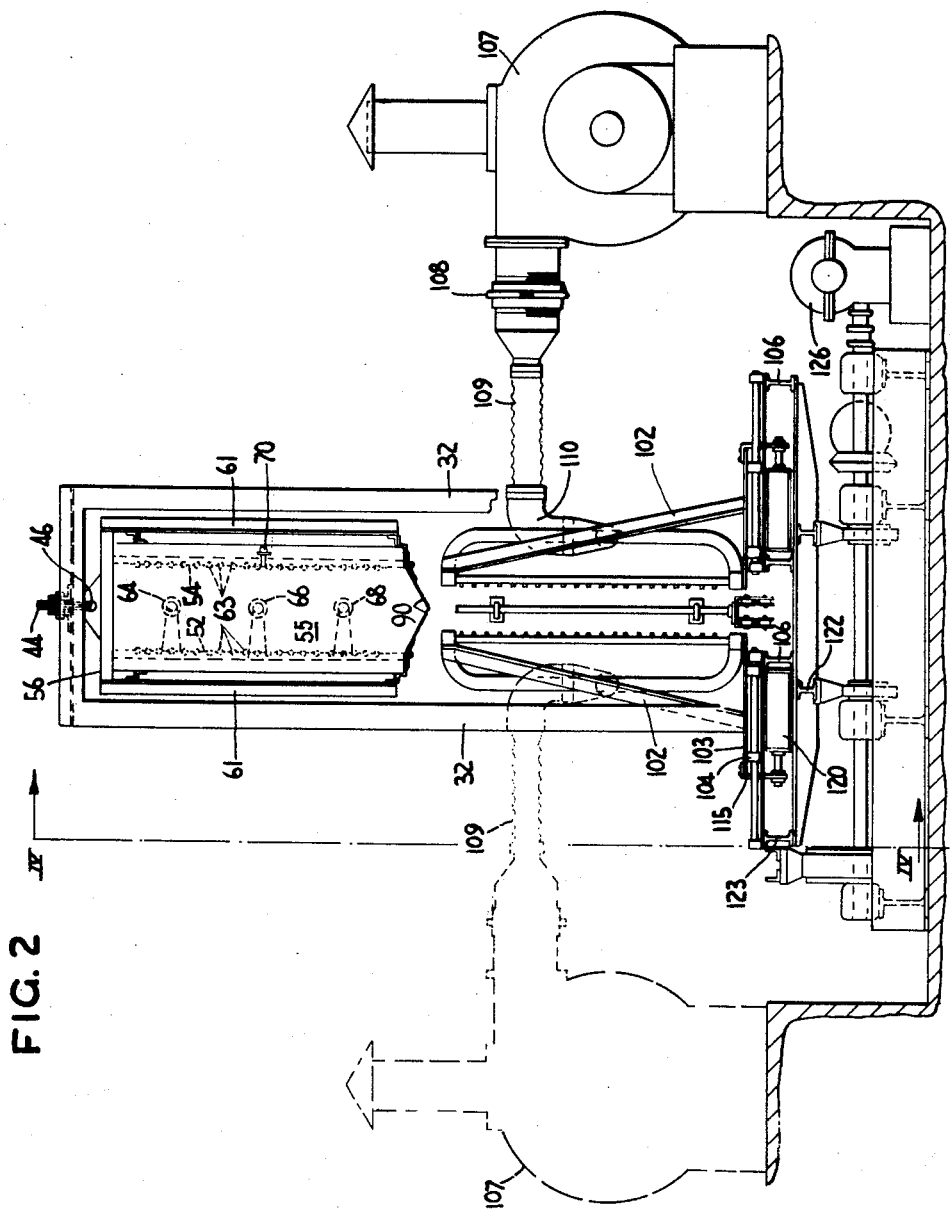
Figure 2 is an end elevational view of the tempering apparatus forming part of Figure 1 showing a furnace in its raised position, and with certain portions of the support structure omitted for sake of clarity.

Referring to Figures 2, 3 and 5, walls 52, 53, 54 and 55 are preferably fabricated of thin sheets of a castable refractory. Walls 52 and 54 are recessed horizontally to support three series of rows of electrical heating elements 63 which face the opposite surfaces of the vertically supported glass sheets when the furnace is lowered. Ray-o-Tubes 64, 66 and 68 (shown in Figure 2) are mounted in the upper, central, and lower regions of wall 55 (Figures 2 and 5) of the heating section and are focused on representative portions of the upper, central and lower portions of the support wall 61 carrying a series of parallel electrical heating elements 63.

The furnace also comprises a glass surface temperature recording pyrometer 70 (Figure 2) mounted on the wall 54. In addition, the bottom of the furnace contains hopper doors 90 hinged for opening and closing to the bottom flanges of the furnace supports 62. The hopper doors provide a closeable floor for the furnace 50.

The Ray-o-Tubes are thermosensitive elements which comprise a mirror, a thermopile at the focal point of the mirror, and an electric circuit actuated in response to the thermopile. Such devices are well known in the art and their structural details are not part of my invention. Ray-o-Tubes 64, 66 and 68 are aimed beyond the edge of the glass sheet G being heated at the wall 52 of the tempering furnace and are adjustable to cause circuits within which they are contained to pass current through the heating elements whenever the temperature of the wall at which the tube is aimed falls below a predetermined level. In effect, the Ray-o-Tubes control the radiant level to which the glass is subjected within the furnace.

The provision of three Ray-o-Tubes in the configuration shown eliminates the natural temperature differential between the top and the bottom of the tempering furnace due to convection currents within the furnace. At a temperature of about 1200° F., the temperature of the top, middle and bottom of the glass sheet being heated by the heating elements 63 can be controlled to within 4° F.

The pyrometer 70 comprises a Ray-o-Tube fitted with a diffusion type band filter between the mirror and the thermopile to filter through to the thermopile energy only in an infrared wave band where the glass is essentially opaque. The pyrometer measures emissivity of the glass surface alone and is unaffected by radiation from the electric heating elements 63 beyond the glass.

Furnace temperature controls

Figure 6:
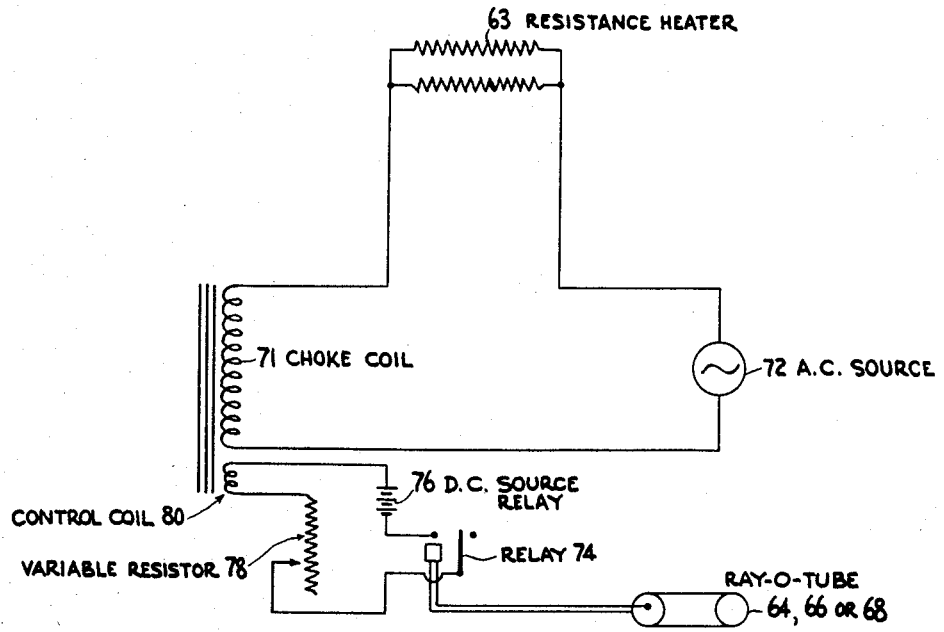
Figure 6 is a schematic circuit diagram of a portion of the furnace temperature control system.
Figure 7:
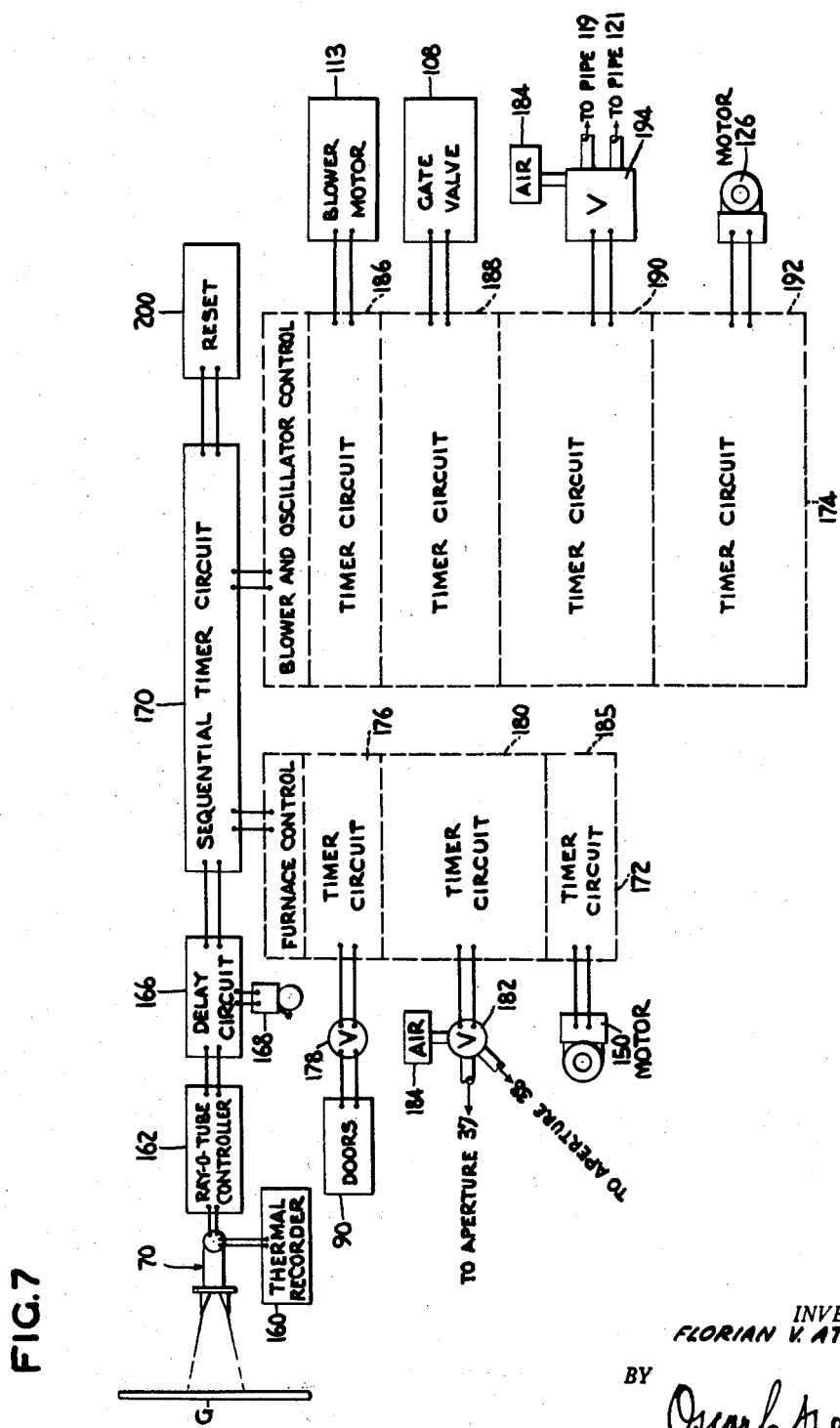
Figure 7 is a schematic electrical diagram of electrical circuitry for controlling operation of the movable elements of the apparatus in their proper sequence.
Figure 8:
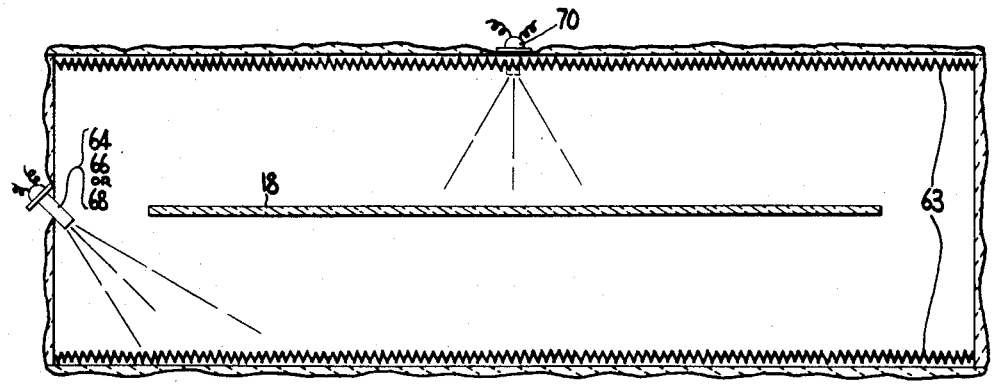
Figure 8 is a view similar to Figure 5 but to a smaller scale and with parts omitted to show the disposition of sensing elements in the furnace.

Referring to Figure 6, the details of a typical circuit designed to maintain the radiant level of the furnace 50 at a predetermined level are disclosed. The circuit includes a heating circuit comprising a choke coil 71, and a source of alternating current energy 72 and the electric resistance heaters 63 which are arranged in parallel for a portion (the upper, the central or the bottom) of the walls of the furnace. Also included in the circuit is a control circuit comprising a Ray-o-Tube 64, 66 or 68, a relay switch 74 responsive to the activation of the Ray-o-Tube in response to a temperature variation, a source of direct current 76, shown as a dry cell, but which may be a rectifier unit, a manually controllable rheostat 78 and a control coil 80.

When no current is flowing through the control circuit, alternating current from source 72 that passes through the heating coils 63 is at a minimum, since the dimensions of choke coil 71 are such to provide a desired maximum potential opposing the voltage supplied from source 72. When the temperature in the area upon which the Ray-o-Tube is trained falls to a predetermined level, the relay switch 74 is actuated, thereby causing current to flow in the control circuit.

The current flow in the control circuit unbalances the heating circuit, and lessens the effect of the choke coil 71 on the voltage being supplied to the heating circuit from the source 72. An increased voltage results across the heating element 63 until such time as the heat imparted by the heating elements causes the temperature in the area scanned by the Ray-o-Tube to rise above the desired level. When this happens, relay switch 74 is deactivated and no current flows through the control circuit, thereby resulting in a resumption of the status of the heating circuit that prevailed prior to the activation of the relay 74. The adjustment of the variable resistor 78 determines the change in amount of heat that is supplied by the heating elements 63 upon activation of the control circuit, since the current flowing through the control circuit determines the inbalance imparted to the heating circuit. The aforementioned operation is typical of the functioning of a commercial saturable reactor circuit.

By maintaining three different heating circuits, each controlled independently of the others by the surface temperature of a different portion of the wall on which the Ray-o-Tubes are trained, and setting the individual Ray-o-Tubes controlling each heating circuit to be responsive at the same temperature, the temperature of the top, center and bottom of the furnace wall is kept at a constant level.

Oscillator construction

A tempering oscillator 100 (Figures 1 through 4) comprising a pair of opposed, movable plenum chambers 101 connected by braces 102 to plates 103 containing bearing brackets 104 with slide rods 105 fixed to cross beams 106 bridging the oscillator pit, is located at the treatment station 30. Blowers 107 supply air under pressure through gate valves 108, flexible couplings 109, connection pipes 110 and passageways 112 to plenum chambers 101. Motors 113 drive fans for blowers 107. Outlet nozzles 114 are provided at the surface of each plenum chamber facing an opposing plenum chamber. Plates 103 are connected by flanged connectors 115, which are fixed to piston rods 116 by tightening nuts 117. Piston 118 moves within a cylinder 120 carried by a movable support beam 122. Cylinder 120 is provided with pipes 119 and 121 on opposite sides of the piston. Spacer supports 123 are also mounted on the support beam 122. Each of the latter is fixed to a cam 124 (Figure 4) for circular orbital movement in response to rotation of the cams. A motor 126 drives the cams 124 through suitable reduction gearing and drive shafts.

A motor 150 is coupled by means of a drive shaft 152 to a link belt 154 which is coupled to the various bottom wheels 16 of the car trucks 14. The various cars 12 are moved about the track 10. Suitable safety devices are included to insure that the heating section is in its raised position before permitting the motor 150 to operate to move the link belt 154 thereby moving the car along the track.

Automatic control circuits

The glass surface temperature pyrometer 70 is connected to a thermal recorder 160 and a Ray-o-Tube controller 162 which may be preset for a predetermined temperature and which comprises a relay. The latter is connected through a delay circuit 166 to a buzzer 168 and a sequential timer circuit 170. The latter circuit has two branches, a furnace position control branch 172 and a blower and oscillator control branch 174, which operate according to an interrelated timing sequence to be described later.

The furnace position control branch includes a timer circuit 176 which operates through a solenoid valve 178 to control the opening and closing of the hopper doors 90. An additional timer circuit 180 is coupled through an electrical response valve 182 to control the passage of air through apertures 37 and 38 from a source of pressurized air 184. Still another timer circuit 185 is coupled to motor 150.

The blower and oscillator control circuit 174 comprises four timer circuits 186, 188, 190 and 192, which control the operation of the motors for blowers 107, opening of the gate valves 180, a valve 194 which controls the flow of air from air source 184 to pipes 119 and 121 of piston cylinder 120, and to motor 126, respectively.

A reset circuit 200 is coupled to the sequential timer circuit.

Operation of apparatus

A typical cycle of operation of the above-described apparatus begins with a glass loaded car 12 in position centrally of the treating chamber with the furnace 50 down, the doors 90 closed and the tempering oscillator 100 in its outward position. Ray-o-Tubes 64, 66 and 68 cause the heating elements 63 to commence their heating cycle. When the glass sheet G reaches its predetermined temperature as "read" by the glass surface pyrometer 70, the controller 162 relay is thrown and the delay circuit 166 actuated, thus sounding buzzer 168 to warn the operator of the start of a cycle. Delay circuit 166 also activates the sequential timer circuit in the following sequence.

Timer circuit 176 activates solenoid valve 178 to open hopper doors 90. Simultaneously, timer circuit 186 initiates the operation of the fan motors 113 for the blowers 107 to increase the pressure to be supplied by the blowers.

Timer circuit 180 actuates valve 182, thus enabling air to be delivered under pressure from air source 184 through aperture 37 of the piston cylinder in pillar 32 to lower piston 34, and raise furnace 50. When furnace 50 is raised sufficiently to clear the top of car 12, timer circuit 176 deenergizes solenoid valve 178, thus permitting hopper doors 90 to close, timer circuit 188 opens the gate valve 108 permitting air from the blowers 107 to pass through the plenum chambers 101 and outlet nozzles 114 to impinge on opposite surfaces of the glass. Timer circuit 190 actuates valve 194 to permit air under pressure from air source 184 to enter pipes 119, thus forcing pistons 118 inwardly within piston cylinders 120 and causing oscillator 100 to assume its inward position. Simultaneously, timer circuit 174 actuates motor 126, thus causing cams 124 to impart a circular orbital motion to the plenum chambers 101.

The air is blown through the nozzles 114 moving with the plenum chambers 101 for a period sufficient to impart the desired temper in the glass sheet G. Then, timer circuit 188 causes gate valves 108 to close, timer circuit 186 deactivates the motors for the blowers 107, timer circuit 192 deactivates motor 126 and timer circuit 190 resets valve 194 so that air from pressurized source 184 is directed through pipes 121, thus forcing pistons 118 out and with them plenum chambers 101.

At this phase of the cycle, timer circuit 185 actuates motor 150 to remove the car containing the tempered glass sheet and replace it with the next car on the track 10, which carries an untreated glass sheet. When the succeeding car is in its proper position for treating the glass it carries, timer circuit 176 again actuates solenoid valve 178 to open doors 90, timer circuit 180 actuates valve 182 into a position where air is supplied to the piston cylinder in pillar 32 via aperture 38 to raise piston 34 and lower furnace 50. The reset circuit 200 then resets the sequential timer circuit 170 for the next cycle.

The introduction of cold glass and its associated car causes a drop in furnace temperature. Ray-o-Tubes 64, 66 and 68 initiate the operation of heating coils 63 in the upper, center and bottom regions of the furnace, respectively, until the radiant level of the furnace is brought into proper adjustment. The cycle of operations described above is repeated for the new sheets.

It is understood that various well known circuits may be utilized for initiating the timer circuits. For example, a bank of cam switches may be rotated in unison, wherein each cam switch triggers a single operation in its desired time sequence. Termination of each operation may also be controlled by the cam bank. A sequence timer switch, such as that disclosed in Bissell Patent 2,050,825 to control three operations, may be modified to initiate the operation of the various operations in their proper sequential relation.

The present apparatus may include special nozzles for blasting dispersions of metal salts that form metal oxides upon contact with the heat softened glass. These dispersions may be substituted for the air that is blasted through the tempering nozzles, or may be applied followed by subsequent tempering. In all these variations, it is understood that the basic principle of the invention is the provision of the special heating section provided with the control elements to impart a particular predetermined temperature to the glass prior to its subsequent treatment and the provision of the specific insulating means comprising part of the present invention. Thus, the present invention insures that the glass is heated to the optimum temperature needed for subsequent treatment regardless of variations in line voltage supplied to the heating elements, variations in glass thickness requiring different duration of glass exposure to the heating elements, variations in the ambient level within the furnace and its surrounding atmosphere, vagaries of operator judgment, and the initial temperature of the glass and its supporting means at the beginning of the heating cycle.

What is claimed is:

1. In apparatus for the thermal treatment of glass sheets comprising a vertically displaceable furnace and a horizontally displaceable fluid dispenser, wherein the furnace comprises heating elements, and means for supporting a glass sheet vertically for thermal treatment, wherein said furnace moves downwardly to encompass the vertically supported glass sheet and moves upwardly to expose the vertically supported glass sheet to fluid dispensed by said fluid dispenser, the improvement comprising thermosensitive control means mounted in said furnace and trained on the glass sheet to determine its temperature, actuating means responsive to the determination by the thermosensitive control means that the glass temperature has reached an optimum elevated temperature desired for the thermal treatment, means for displacing the furnace vertically, means for displacing the fluid dispenser horizontally, means for dispensing fluid through said fluid dispenser, said last three named means being operatively connected to said actuating means, whereby the furnace is raised, the fluid dispenser is displaced horizontally toward the glass sheet and the fluid is dispensed through said dispensing means automatically when the heating elements heat the glass sheet to the predetermined elevated temperature.

2. The improvement according to claim 1 including a pair of hopper doors to provide a closable floor for said furnace, and door opening and closing means operatively connected to said actuating means to cause the doors to open when the glass temperature reaches its desired level and cause the doors to close when they move upwardly above the vertically supported glass sheet.

3. The improvement according to claim 1 wherein additional thermosensitive control means are mounted in said furnace, the heating elements are electrical and arranged in individual circuits located at different levels of the furnace, each additional thermosensitive control means being trained on a portion of a different heating circuit to control the thermal output of its electrical heating element and provide temperature uniformity from top to bottom of the furnace.

4. In apparatus for the thermal treatment of glass sheets comprising a furnace having heating elements, means for supporting a glass sheet in said furnace, a fluid dispenser, and means causing relative motion between the glass sheet supporting means, and the furnace and fluid dispenser, the improvement comprising thermosensitive control means mounted in said furnace and trained on the glass sheet to determine its temperature, actuating means operatively associated with said thermosensitive control means and responsive to the determination by the thermosensitive control means that the glass temperature has reached a predetermined elevated temperature needed for subsequent treatment, means operatively connected to said actuating means for causing relative motion between the glass sheet supporting means on the one hand and the furnace and fluid dispenser on the other hand to cause the glass sheet to be sequentially located adjacent the furnace heating elements and the fluid dispenser, and means operatively associated with said last named means for dispensing fluid through said fluid dispenser when the glass sheet supporting means is adjacent the fluid dispenser, whereby the glass sheet is heated to the predetermined temperature and thereafter subjected to fluid dispensed by the fluid dispenser.

5. The improvement according to claim 4, wherein the fluid dispenser comprises a source of air under pressure and spaced sets of opposed nozzles for dispensing air on opposite surfaces of the heated glass sheet.

6. The improvement according to claim 4, wherein the fluid dispenser comprises means for spraying a dispersion containing a metal salt onto a surface of the heated glass sheet.

(References on following page)

References Cited in the file of this patent

UNITED STATES PATENTS

| | | | |
|---|---|---|---|
| 1,227,027 | Bailey et al. | May 22, | 1917 |
| 1,427,319 | Peacock | Aug. 29, | 1922 |
| 1,842,967 | Hegel | Jan. 26, | 1932 |
| 1,900,583 | Owen | Mar. 7, | 1933 |
| 1,970,730 | Black | Aug. 21, | 1934 |
| 2,079,566 | Wadman | May 4, | 1937 |
| 2,116,450 | Richardson et al. | May 3, | 1938 |
| 2,187,613 | Nichols | Jan. 16, | 1940 |
| 2,263,679 | Ferre | Nov. 25, | 1941 |
| 2,404,060 | Hall et al. | July 16, | 1946 |
| 2,518,996 | Peckham | Aug. 15, | 1950 |
| 2,577,611 | Eves | Dec. 4, | 1951 |
| 2,668,701 | Dietrich | Feb. 9, | 1954 |
| 2,687,289 | Cline et al. | Aug. 24, | 1954 |
| 2,695,475 | Ellis | Nov. 30, | 1954 |
| 2,763,704 | Head | Sept. 18, | 1956 |

FOREIGN PATENTS

| | | | |
|---|---|---|---|
| 457,488 | Great Britain | Nov. 30, | 1936 |
| 115,264 | Sweden | Mar. 16, | 1944 |